B. S. ARNOLD.
POPPET VALVE FOR INTERNAL COMBUSTION ENGINES.
APPLICATION FILED JUNE 13, 1921.
1,434,473.  
Patented Nov. 7, 1922.
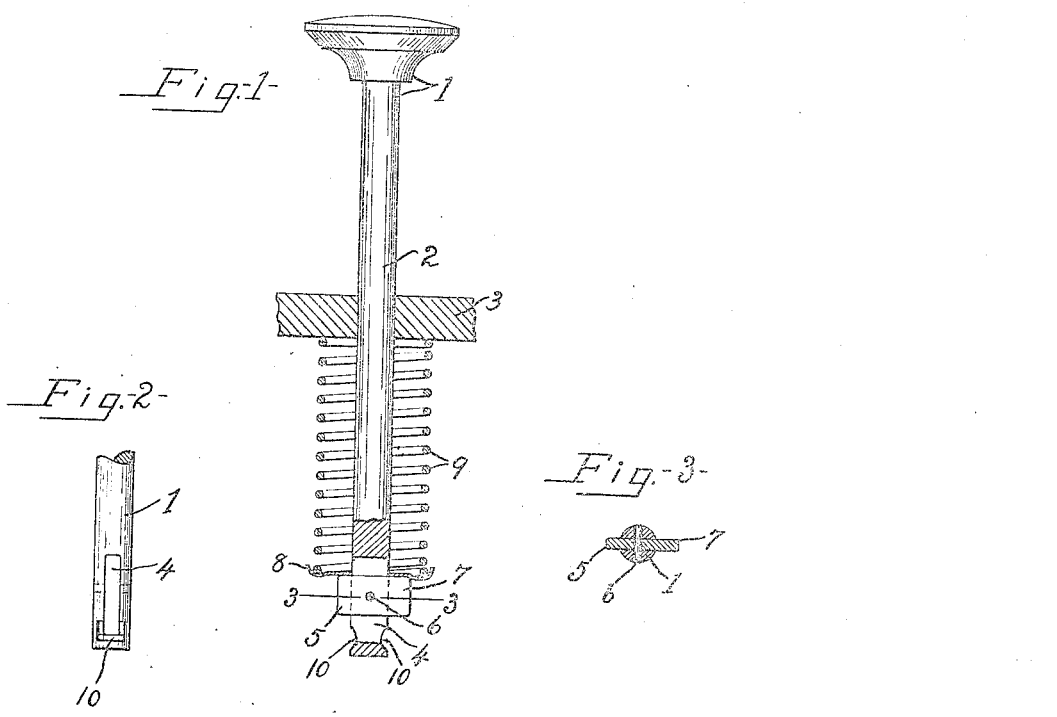

Patented Nov. 7, 1922.

1,434,473

UNITED STATES PATENT OFFICE.

BENJAMIN S. ARNOLD, OF SYRACUSE, NEW YORK.

POPPET VALVE FOR INTERNAL-COMBUSTION ENGINES.

Application filed June 13, 1921. Serial No. 477,251.

*To all whom it may concern:*

Be it known that I, BENJAMIN S. ARNOLD, of Syracuse, in the county of Onondaga, in the State of New York, have invented new and useful Improvements in Poppet Valves for Internal-Combustion Engines, of which the following, taken in connection with the accompanying drawings, is a full, clear, and exact description.

This invention relates to a poppet valve for internal combustion engines in which a coil spring surrounding a portion of the valve stem is normally compressed between a portion of the engine frame, and a washer on the valve stem and employed to automatically close the valve after being operated upon by a suitable cam shaft.

These washers are usually held in operative position upon the valve stem against the action of the spring by means of a pin slidable diametrically through an opening in said stem and must be entirely removed to release the tension of the spring and permit the removal of the valve when desired for cleaning, grinding or for any other purpose.

These pins are necessarily very small usually about an eighth of inch in diameter and about three-quarters of an inch long, and owing to the compact relation of the valves and spring to the frame and other parts of the engine and also to the fact that some sort of lifting instrument must be employed to raise the washer against the action of the spring to permit the removal and replacement of the pins, it is found to be extremely difficult to effect this removal and replacement of the pins without frequently dropping and losing them in the under-lying parts of the machine resulting in a considerable loss of time in recovering or replacing said pins, and the main object of my present invention is to incorporate the washer holding means in and upon the valve stem as a permanent part thereof, and at the same time to permit it to be readily adjusted by hand to and from its holding position whereby when the washer is lifted against the action of the spring to relieve pressure upon the holding device, the latter may be turned to assume a position lengthwise of the valve stem, thus permitting the valve with the holding means thereon to be removed with the assurance that it will not become displaced from the valve stem and that when the valve is reassembled, the holding device may be easily and quickly adjusted to its holding position.

Other objects and uses relating to specific parts of the device will be brought out in the following description:

In the drawings:

Fig. 1 is an elevation partly in section of a valve embodying the features of my invention in operative position.

Fig. 2 is a side elevation of a lower portion of the valve stem.

Fig. 3 is a transverse sectional view taken on line 3—3, Fig. 1.

In order that my invention may be clearly understood, I have shown a portion of a valve —1— having its stem —2— guided in a portion of the engine frame as —3— and provided at its lower end with a longitudinally elongated and diametrically extending slot —4— for receiving a locking-member —5— which is pivoted at —6— to the walls of the slot to swing vertically.

One end as —7— of a locking member —5— is weighted preferably by making it of greater radial length than the opposite side to cause the locking member to automatically assume a position lengthwise of and within the slot —4— when the washer as —8— is lifted out of engagement therewith against the action of a retracting spring —9— which is interposed between the washer —8— and adjacent portion of the frame —3—.

The washer —8— and spring —9— are of the usual construction commonly employed in connection with the valves of internal combustion engines of the L-type for causing the valve to close against its seat after being open by a camshaft not shown.

The locking-member —7— serves as an abutment on the valve stem against which the washer —8— is held by the spring —9— to cause the spring to function properly in automatically closing the valve and is permanently connected to the valve stem by the pivot —6— so that when it is desired to remove the valve for cleaning or other purposes, it is simply necessary to apply a suitable lifting device to the under side of the washer —8— to lift the same against the action of the retracting spring —9— out of engagement with the locking member —5—, whereupon said locking-member will automatically turn about the axis of its pivot —6— by reason of its weighted side —7— until it assumes a position lengthwise of and wholly within the slot —4—, after which the valve may be withdrawn upwardly through the opening in the washer —8— and removed from the engine if desired or the washer may be released of its lifting means and allowed to be forced downwardly by the spring —9— to permit the valve to be freely rotated against its seat for grinding purposes.

The locking member or movable abutment —5— preferably consists of a flat piece of hardened steel of considerably less thickness than the diameter of the valve stem —2—, while the slot —4— corresponds in thickness and length to the thickness and length of the abutment —5—, although it is sufficiently longer to permit the abutment to rock freely therein and lengthwise thereof, it being understood that the width of the abutment or locking-member —5— is of about the same diameter as the diameter of the valve stem and that the pivot —6— is disposed in the longitudinal center of the valve stem to permit the locking member —5— to pass through the hole in the washer —8— when adjusted lengthwise of the valve stem.

It will also be observed that the distance between the pivot —6— and lower end of the slot —4— is slightly greater than the distance between the same pivot and weighted end of the locking-member —5— to allow said locking-member to automatically rock to its releasing position when freed from engagement from the under side of the washer —8—.

In order that the locking-member or abutment —5— may be easily and quickly turned from its lengthwise position to a cross-wise position by hand while the valve is in operative position, portions of the opposite sides of the valve stem below the pivot —6— and slightly below the lower end wall of the slot —4— are provided with recesses —10— for receiving the ends of the fingers by which the weighted end of the locking-member may be pushed or pulled laterally a sufficient distance to permit it to be engaged by the fingers and adjusted to its cross-wise position after the washer has been lifted some distance above the upper end of the slot against the action of the spring —9—, whereupon the washer may be released to allow the spring to force said washer downwardly against the upper edge of the locking-member, thereby establishing a proper connection between the spring and valve for the work-operation thereof.

What I claim is:

1. In combination with a relatively stationary part of an internal combustion engine having a guide-opening therein, a poppet valve having a stem movable in said guide-opening, a washer slidable lengthwise of and upon the valve stem, a coil spring interposed between the washer and said stationary part of the engine and tensioned to normally force the washer toward the end opposite the valve head, and an abutment pivoted to the valve stem to swing from a position lengthwise of the stem to a cross-wise position and vice versa for engaging and disengaging the outer face of the washer at opposite sides of the valve stem.

2. In combination with a relatively stationary part of an internal combustion engine having a guide-opening therein, a poppet valve having a stem slidable endwise in the guide-opening, said valve stem having a diametrically extending slot therethrough, a washer encircling the valve stem, a coil spring encircling the valve stem and normally compressed between the washer and relatively stationary part of the engine, an abutment pivoted to the valve stem to swing in said slot from a position lengthwise of the stem to a cross-wise position and vice versa for engaging the outer face of the washer at both sides of the valve stem when in its cross-wise position.

3. In combination with a relatively stationary part of an internal combustion engine having a guide-opening therein, a poppet valve having a stem slidable endwise in the guide-opening, said valve stem having a diametrically extending slot therethrough, a washer encircling the valve stem, a coil spring encircling the valve stem and normally compressed between the washer and relatively stationary part of the engine, an abutment pivoted to the valve stem to swing in said slot from a position lengthwise of the stem to a cross-wise position and vice versa for engaging the outer face of the washer at both sides of the valve stem when in its cross-wise position, said abutment having one end weighted to cause it to assume a lengthwise position when the washer is released from engagement therewith.

4. In combination with a relatively stationary part of an internal combustion engine having a guide-opening therein, a poppet valve having a stem slidable endwise in the guide-opening, said valve stem having a diametrically extending slot therethrough, a washer encircling the valve stem, a coil spring encircling the valve stem and normally compressed between the washer and relatively stationary part of the engine, an abutment pivoted to the valve stem to swing in said slot from a position lengthwise of the stem to a cross-wise position and vice versa for engaging the outer face of the washer at both sides of the valve stem when in its cross-wise position, said valve stem being provided with a peripheral recess to permit the insertion of a portion of the finger for engaging and rocking the movable abutment from its lengthwise position to enable it to be more easily adjusted to its cross-wise position.

In witness whereof I have hereunto set my hand this 7th day of June, 1921.

B. S. ARNOLD.

Witnesses:
HOWARD P. DENISON,
E. M. FRADENBURGH.